United States Patent [19]

Schneider

[11] 3,729,580

[45] Apr. 24, 1973

[54] TELEVISION CAMERA SYSTEM

[75] Inventor: Hans-Dieter Schneider, Gross-Gerau, am Bruckelchen, Germany

[73] Assignee: Fernseh GmbH, Darmstadt, Germany

[22] Filed: Apr. 18, 1972

[21] Appl. No.: 245,108

Related U.S. Application Data

[63] Continuation of Ser. No. 873,310, Nov. 3, 1969, abandoned.

[52] U.S. Cl. ..........................178/5.4 R, 178/DIG. 25

[51] Int. Cl. ..........................H04n 9/04

[58] Field of Search ....................178/5.4 R, 5.4 TC, 178/DIG. 25

[56] References Cited

UNITED STATES PATENTS

| | | | |
|---|---|---|---|
| 2,858,362 | 10/1958 | Bedford | 178/5.4 R |
| 2,969,424 | 1/1961 | Tait | 178/5.4 TC |
| 2,971,053 | 2/1961 | Gibson | 178/7.1 |
| 3,196,205 | 7/1965 | Bedford | 178/5.4 TC |
| 3,340,356 | 9/1967 | James | 178/5.4 TC |
| 3,495,029 | 2/1970 | Underhill | 178/5.4 TC |

FOREIGN PATENTS OR APPLICATIONS

| | | | |
|---|---|---|---|
| 1,041,590 | 9/1966 | Great Britain | 178/5.4 |

*Primary Examiner*—Richard Murray
*Attorney*—Carroll B. Quaintance et al.

[57] ABSTRACT

A television system for deriving a luminance signal from a color camera system by matrixing a first signal corresponding to a spectral distribution between the luminosity function of the human eye and the spectral distribution of the primary color green and at least one second signal corresponding to another primary color in a disclosed manner, thereby reducing the effect of color fringing caused by misregistration; preferably a contour signal derived from said first signal is added to the gamma corrected luminance signal.

7 Claims, 3 Drawing Figures

Inventor:
Hans Dieter Schneider by
Littlepage, Quaintance, Wray & Aisenberg
Attorneys Inventor:
Hans Dieter Schneider by Littlepage, Quaintance, Wray & Aisenberg
Attorneys

TELEVISION CAMERA SYSTEM

This is a continuation of application Ser. No. 873,310, filed Nov. 3, 1969 now abandoned.

BACKGROUND OF THE INVENTION

1. Field of the Invention

This invention relates to a system for generating camera output signals for use in a color TV system.

2. Description of the Prior Art

It is known that all compatible color T. V. systems (NTSC, PAL, SECAM) presently in use transmit a full bandwidth luminance signal, e.g. 5 MHz, and a chrominance signal of smaller bandwidth, e. g. 1.5 MHz, in the form of a chrominance subcarrier modulated by two color-difference signals. The smaller bandwidth for the color information makes use of the lesser ability of the eye to distinguish differences in color shades as opposed to differences in brightness. The three components of the color-picture signal(luminance signal Y, and color difference signals R-Y, and B-Y) are generally formed by a coder from the three primary color signals for the primary colors R, G, B, (Red, Green, Blue). The coder limits the color-difference signals to the smaller bandwidth sufficient for transmitting the color information.

The color T. V. camera generates the three primary color signals for the three primary colors R, G, and B by means of three electro-optical transducers (camera tubes). Selective color images with the spectral distribution of the three primary colors are obtained on the photo-sensitive layers of the transducers by lenses and light splitters on the photo-sensitive layers of the transducers.

The reproduction of the color television image from the color picture signal described above is characterized by frequent picture disturbances in the form of color fringing at sudden changes in brightness or hue.

This is mainly caused by the fact that the signals originating in the color T. V. camera and doded to form the color picture signal are obtained from channels of different bandwidth and resolution.

The process of producing the luminance signal by combining a low-frequency component and a high-frequency component is already known. In this process, the low-frequency component of the signal is formed of the gamma-corrected camera signal component that is limited to the same bandwidth, and the high frequency component is formed from the high frequency signals produced in the caera prior to gamma-correction, in order to improve the resolution of the compatible T. V. image which is determined by the luminance signal. (See British Pat. No. 1,033,413). By limiting the camera signals to the same bandwidth, the above mentioned cause of color fringing is avoided. During practical operation, however, the images of different spectral distribution on the photo-sensitive layers of the camera tube are not necessarily always in precise registration. This system also has color fringing at sudden brightness or hue transitions, since signal changes in different channels do not occur in the same areas of the color television picture.

SUMMARY OF THE INVENTION

The invention is based upon recognition of the fact that color fringing effected by the above-mentioned causes are much less apparent if, in the coding process, portions of the color signals needed to form the low-frequency component of the luminance signal and the third color signal are reduced. Consider a color T. V. camera system with two channels of low resolution for the primary colors red and blue, from which two signals are obtained, and a high-resolution channel from which the luminance signal is obtained, while the third color signal for the primary color green is derived from the high-resolution channel by matrixing, using the signal limited to the bandwidth of the color-value signals. According to this invention, the high-resolution channel carries a signal W with a spectral distribution lying between the primary color green and the eye sensitivity $V_\lambda$ . In a linear matrix circuit, a luminance signal $Y_L$ is obtained from a band-limited signal component $W_L$ of signal W by addition, and the third color signal $G_L$ for the primary color green is formed by subtraction of appropriate portions of the color signals $R_L$ and $B_L$ of the primary colors red and blue. The luminance signal component $Y_L$ is supplemented with a high-frequency component $W_H$ of the signal W.

Compared to a color television camera system with three color channels for the primary colors red, blue and green and a color television system using two color channels and separate luminance channel, the color T. V. camera system described above is characterized by the advantage that smaller components of the color-signals used to form a signal are necessary to produce the low-frequency component of the luminance signal, and of the third color signal.

A certain disadvantage of the above-described color T. V. system, however, arises because the luminance signal shows exact spectral distribution only in the low-frequency range while in the high frequency range more or less serious deviations will occur.

To avoid this disadvantage, in a development of this invention, at least one of the two color channels has the same resolution as the third channel. The third color signal, as well as a high-resolution luminance signal, to which is added a correction signal derived by aperture correction from the signal of the third channel, are formed by linear combination of the three signals in proper proportions in a linear matrix circuit. From the above it is apparent that no band limitation of the high-frequency channel signal takes place prior to matrixing, and at least one of the two color channels, preferably the channel of the primary color red, shows the same high resolution as the third channel of the signal W.

For the channel of the second primary color, preferably blue, a lesser resolution is sufficient, as only small portions of the signal of the primary color blue are necessary to form the luminance signal and the third color signal of the primary color green. An aperture correction is preferably carried out in the path of the high frequency portion of the signal W.

BRIEF DESCRIPTION OF THE DRAWINGS

The following figures show the invention in further detail.

In the figures only the parts necessary for the understanding of the invention are schematically depicted. Identical parts are indicated with identical numbers.

DESCRIPTION OF THE PREFERRED EMBODIMENT

Figure 1:
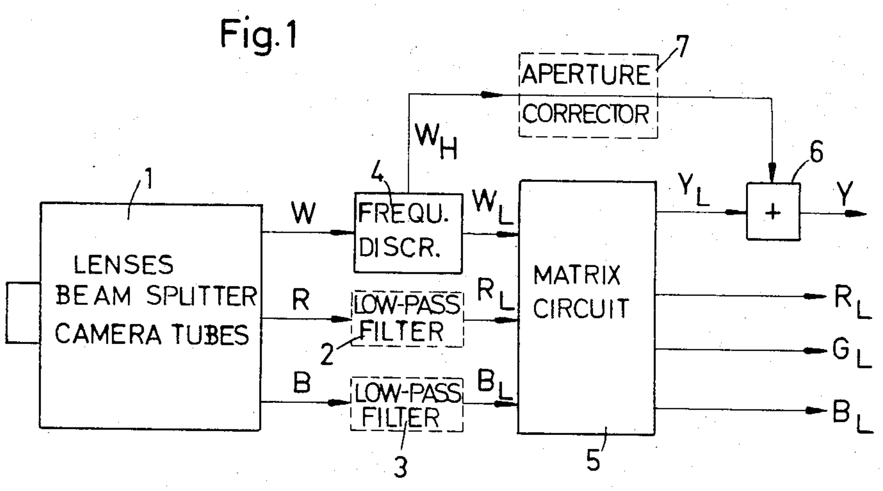
FIG. 1 is a schematic diagram of a color T. V. system according to one embodiment of this invention.

In FIG. 1, system 1 contains the optical system of the color television camera and the electro-optical transducers, which are preferably camera tubes. This system produces two primary signals R and B of low resolution and a signal W of high resolution, with a spectral distribution lying between the spectral distribution of the primary color green and the spectral eye-sensitivity curve $V_\lambda$ . If necessary, the signals R and B are limited by the low pass filters 2 and 3 to a smaller bandwidth, equal for each signal, and these band-limited signals $R_L$ and $B_L$ are directed into the matrix circuit 5. The high resolution signal W is split by a frequency discriminator 4 into a high frequency component $W_H$ and a low frequency component $W_L$, with the low frequency component $W_L$ having the same bandwidth as the signal $R_L$. The low-frequency component $W_L$ is also directed into the matrix circuit 5.

The third color signal $G_L$ is formed in the matrix 5 by means of known linear matrix circuits from the three low-frequency signals $W_L$, $R_L$, and $B_L$ by subtraction of proper portions of the signals $R_L$ and $B_L$ from the signal $W_L$ of the same bandwidth. A luminance signal component $Y_L$ of the same bandwidth is generated through addition of proper portions of the signals $R_L$, $B_L$ to the signal W. In order to form the complete full-bandwidth luminance signal Y, the higher frequency portion $W_H$ of the signal W is added to the luminance signal portion $Y_L$ from the frequency discriminator 4 in an addition stage 6, after passing if necessary through a vertical and horizontal aperture corrector 7.

Figure 2:
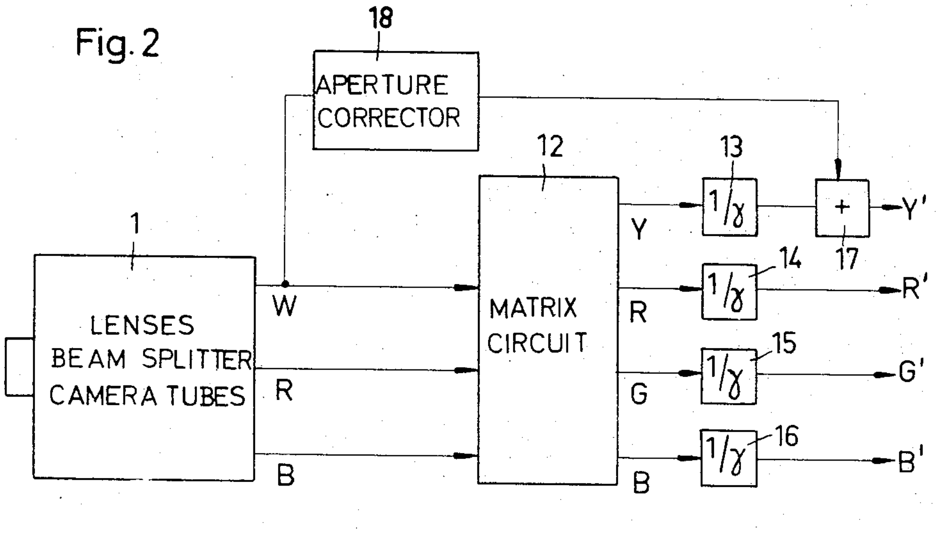
FIG. 2 is a schematic diagram of a color T. V. system in another embodiment of the invention.

In FIG. 2, the color television camera 1 contains as its essential parts the lenses, the beam splitter, and the camera tubes. The beam splitter is designed so that one camera tube generates a signal W corresponding to the spectral distribution between the primary color green and the sensitivity of the eye, a second camera tube generates a signal R corresponding to the spectral distribution of the primary color red, and a third camera tube generates a signal B with a spectral distribution corresponding to the primary color blue.

Due to the corresponding design of the color T. V. camera, the signal R has the same high resolution as the signal W. This is carried out, for example, by splitting the light for the images of the pick-up tubes for the signals W and R by means of a prism with dichroic layers, so that both images are equal with respect to focus and size. If the same standards were applied to the signal B, this would require a significant portion of the available total light intensity with unfavorable effects on sensitivity and signal-to-noise ratio. In order to avoid these effects the electro-optical resolution in the channel for the signal B may, as mentioned above, be smaller than in the two other channels without noticeably impairing the quality of the color picture.

In this context, electro-optical resolution is understood to mean the total resolution of the picture signal resulting from the resolution of the optical system, the resolution of the camera tubes, and the bandwidth of the amplifiers for the camera tube signals. Due to the lesser resolution which may be tolerated in a color channel, the image on the camera tube that produces the signal B, may for example, be generated in a smaller scale than the images on the two other camera tubes, so that the same brightness, and accordingly the same signal-to-noise ratio are obtained from a proportionately smaller part of the available light. In the optical system of the color T. V. camera, this may be achieved by an intermediate lens for the image of the primary color blue.

The above mentioned signals W, R and B which are identified according to bandwidth and spectral distribution, are now directed into a matrix circuit 12. In this matrix circuit, a luminance signal Y, and the three color signals R, G and B are formed through linear combination of the signal W with appropriate portions of the signal R and B. These four signals are then gamma-corrected in the stages 13, 14, 15 and 16 in order to compensate for the non-linear picture tube characteristic. In order to improve contour sharpness, a contour signal derived from the signal W by aperture correction in the aperture corrector 18 is added to the luminance signal. The correction signal is preferably added to the gamma-corrected luminance signal after it passes stage 13, by means of the addition stage 17. As a result, the gamma-corrected signals Y, R, G and B are obtained from which the luminance signal and the chrominance signal are formed by known procedures according to the color T. V. standard that is used, which may be, for example, a luminance signal Y' and two color-difference signals R'-Y' and B'-Y' (not shown).

Figure 3:
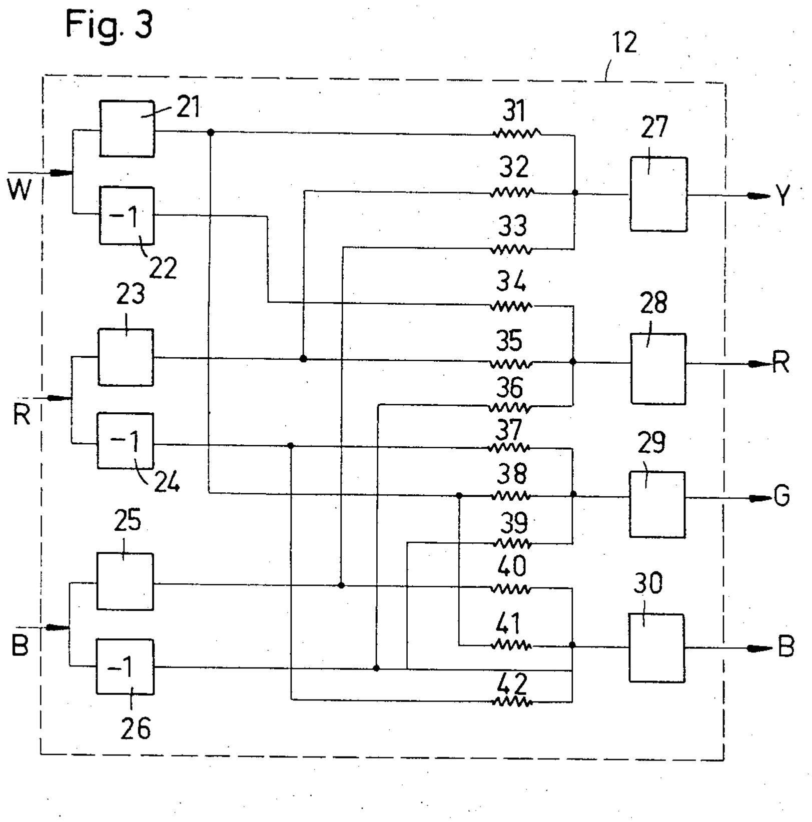
FIG. 3 is a schematic block diagram of a matrix circuit as used in a system of FIG. 2.

FIG. 3 shows an example of an embodiment of the matrix 12 having two impedance transformer stages 21 and 22; 23 and 24; and 25 and 26 for each of the three signals W, R, and B. The output impedance of the impedance transformer stages is very small in comparison to resistor values of the matrix circuit, being preferably less than 1 ohm. Furthermore, the polarity is reversed in the stages 22, 24 and 26, so that the respective signals leave these stages with reversed polarity as compared to the output of stages 21, 23 and 25.

Impedance transformer stages 27, 28, 29 and 30 provide the matrix circuit outputs for the signals Y, R, G and B and have a small input-impedance compared to the values of the attached resistor combinations, being preferably also smaller than 1 ohm. In order to form the output signals Y, R, G and B from the input signals W, R and B, the matrix circuit 12 contains a network of resistors, with the resistors 31 to 42 in the configuration shown schematically in FIG. 3.

The luminance signal Y is formed by additive combination of appropriate portions of the signal W and the signals R and B, the portion of the signal W being the largest. In this manner the portions of the spectrum missing in signal W, as compared to the spectral distribution of eye sensitivity, are supplemented. The relative shares of the signals R and B depend upon the choice of spectral distribution in the signal W. If, for example, the short wave portions of the signal W and the eye-sensitivity curve are in approximate correspondence, it is sufficient to add just one portion of the red signal to the signal W, so that resistor 33 may be omitted from the matrix circuit 12. To form the green signal, corresponding portions are subtracted from the red and blue signals. The red and blue signals may be corrected by subtraction of small portions of the W signal and the other color signal in this way, the negative portions of the color-mixture curve may also be approximately reduced.

A color television camera system according to the invention consequently results in a luminance signal Y with accurate spectral distribution over the entire frequency range. In order to increase the sharpness of the TV image which is determined by the luminance signal, according to a further characteristic of the invention, a contour signal is formed by horizontal and vertical aperture correction of the signal W and added to the luminance signal which has been formed by matrixing. Thus, the color fringing due to imperfect spectral distribution of the luminance signal caused by sudden brightness changes remains limited to a very small range.

The approximately linear camera signals are used to form the luminance signal and the third color signal in a matrix. Gamma correction to compensate for the nonlinear picture tube characteristic takes place only after matrixing in the four channels for the luminance signal and the three color signals. According to a further development of the invention, the correction signal form the high resolution channel is added with good results to the gamma corrected luminance signal. This results in a better signal-to-noise-ratio in the luminance channel.

What is claim is:

1. A color television camera system comprising a. two color channel inputs of low resolution for the primary colors red and blue, from which two channels two color signals are obtained, b. a high-resolution channel input from which a luminance signal is derived, the high-resolution channel being provided with a signal having a spectral distribution between the primary color green and light at the eye sensitivity value $V_\lambda$ , c. frequency discriminator means connected to the high-resolution channel input for passing a high-frequency high-resolution component of the W signal to a first line and for passing a low-frequency low-resolution component of the W signal, which has resolution equal to the low resolution of said two color signals, to a second line, d. a matrix connected to the two color channel inputs and to the second line for generating a third color signal for the primary color green, said matrix receiving the low-resolution component from the second line and the color signals, e. means in said matrix for obtaining a luminance signal component $Y_L$ by addition of all matrix inputs, f. means in said matrix for forming a third color signal $G_L$ by subtraction of the color signals $R_L$ and $B_L$ of the respective primary colors red and blue, from the low-resolution luminance signal and g. means for adding said luminance signal component $Y_L$ with the high-frequency component of the W signal from the first line.

2. A system according to claim 1, further comprising aperture correction means in the path of the high-frequency component of the W signal.

3. In a color television camera system with two color channels for the primary colors red and blue from which two color signals are obtained, and a high-resolution third channel with a spectral distribution between the primary color green and eye sensitivity V , the luminance signal being obtained from said third channel, the improvement wherein:

a first one of said two color channels is characterized by the same high resolution as said third channel, a second one of said two color channels is characterized by low resolution, and wherein the system further comprises:

a. matrix means connected to the first and third channels of high resolution and to the second channel of low resolution for linear combination of appropriate portions of the signals of the three channels to form a third color signal and a high-resolution luminance signal Y, b. aperture correction means for forming a contour signal form the signal of the third channel and c. means for adding to said contour signal to said high-resolution luminance signal.

4. A system according to claim 3 wherein said first one of said two channels carries the signal for the primary color red.

5. A system according to claim 3, further comprising first, second, third, and fourth gamma correctors respectively connected to luminance, first, second and third color output of the matrix and wherein the contour signal is added to a gamma-corrected luminance signal.

6. A system according to claim 3, wherein for the input signals (W, R, and B) and the output signals (Y, R, G and B), the linear matrix circuit (12) uses impedance transformer stages of low input and output resistance as compared to the resistance values of the resistance combinations of the matrix circuit.

7. A system according to claim 6, further comprising two impedance transformer stages for each input signal, each pair of said transformer stages producing signals of opposite polarity.

* * * * *